United States Patent Office 3,361,812
Patented Jan. 2, 1968

3,361,812
SUBSTITUTED UREA DERIVATIVES USEFUL AS EMULSIFIERS AND AS TEXTILE AUXILIARIES
Kurt Hofer, Munchenstein, Rudolf Kessler, Reinach, Basel-Land, and Urs Sollberger, Basel, Switzerland, assignors to Sandoz Ltd., Basel, Switzerland
No Drawing. Filed Aug. 3, 1964, Ser. No. 387,213
Claims priority, application Switzerland, Aug. 30, 1963, 10,770/63
7 Claims. (Cl. 260—553)

ABSTRACT OF THE DISCLOSURE

Compounds of the formula $$R_1R_2N-CH_2CH_2-CO-NH-R_3$$

acid addition salts and quaternary ammonium compounds thereof, wherein $R_1$, $R_2$ and $R_3$ have the significances hereinafter defined, are useful as emulsifiers, e.g., in emulsion polymerization, and as agents for treating fabrics, synthetic materials and the like.

---

The present invention relates to new urea derivatives and a process for their production and also their use as emulsifiers, especially in emulsion polymerization, and as agents for treating fabrics, synthetic materials and the like.

The present invention provides compounds of formula $$R_1R_2N-CH_2CH_2-CO-NH-R_3$$

in which $R_1$ is selected from the class consisting of alkyl $(C_8-C_{22})$ and

$R_2$ is selected from the class consisting of hydrogen, —$CONH_2$,

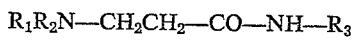

and $$-CH_2CH_2-CO-NH-R_3$$

$R_3$ is selected from the class consisting of alkyl $(C_1-C_{22})$ and

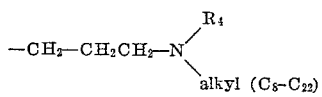

where
$n$ is an integer selected from 2 and 3,
$R_4$ is selected from the class consisting of hydrogen, alkyl $(C_1-C_{22})$, —$CONH_2$ and

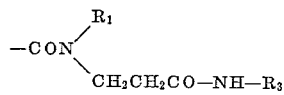

$R_5$ is selected from the class consisting of hydrogen and alkyl, with the proviso that the entire molecule must contain at least one grouping —NCON—, the acid addition salts of the said compounds and their quaternary ammonium compounds.

The present invention also provides a process for the production of the above urea derivatives, characterised in that at least one carbonic acid residue is introduced into an amide of β-aminopropionic acid containing at least one alkyl radical having 8 to 22 carbon atoms in its molecule.

The introduction of the carbonic acid residue may be effected in various ways, for example, by reacting the amide of β-aminopropionic acid with urea at an elevated temperature so that ammonia is split off. However, this introduction may likewise be effected by reaction of the said amide with carbon dioxide, an ester of carbonic acid (e.g., alkyl carbonates), a urethane, a cyanate (e.g., ammonium cyanate), an isocyanate, an acid halide or ester of carbaminic acid (e.g., its chloride) or phosgene, there being produced a urea derivative containing one or more residues of an amide of β-aminopropionic acid.

The urea derivatives of the invention in the form of their acid addition salts or of their quaternary ammonium compounds are soluble or emulsifiable in water and in this form are suitable as emulsifiers in emulsion polymerization.

The present invention also provides a dye bath liquor containing, in addition to dyeing ingredients, a urea derivative as defined above.

The present invention also provides a method of effecting emulsion polymerization which includes the use of a urea derivative as defined above.

The present invention also provides a method of treating synthetic polyamide fibres by immersing said fibres in a bath containing a urea derivative as defined above.

It should be noted that in the formulae in Examples 5c and 6c the radical R signifies the arachinyl or behenyl residues (i.e., $C_{20}H_{41}$ and $C_{22}H_{45}$).

In the following examples, which illustrate the invention without limiting it, the temperatures are stated in degrees centigrade.

In each of these examples the production of the basic β-aminopropionic acid amides is described first and later their carbamidation and quaternization. The abbreviation AZ therein signifies the amine number, i.e., the amount of perchloric acid in mg. required to neutralize 1 g. of the amine. The AZ actually determined and the theoretical value of the essentially resulting carbamidation product given in said examples is an indication of the purity of the latter.

Dinoram S mentioned in some of the examples is a product of Prochinor S.A. Paris, France; it consists of a technical mixture of arachinyl- and behenylpropylenediamine-1,3 and its molecular weight, based on the amine number, is 363.

EXAMPLE 1

(1a) *Addition of stearylamine to acrylic acid ethyl ester in the mol ratio 1:2*

In 1617 g. (6 mol) of molten stearylamine 1260 g. (12.6 mol) of acrylic acid ethyl ester is added at 40–50° while stirring well and cooling gently. During the course of 4 hours the temperature is gradually raised to 95–100°. After about 20 hours the addition is complete. The excess of acrylic acid ethyl ester is distilled off in a vacuum from the addition product at 30°. The resulting diester is a dark red liquid whose AZ is 207.5.

The AZ of the resulting β-stearylaminodipropionic acid diethyl ester is 214.

The yield is 2766 g.=98.2% of theory.

Instead of stearylamine it is likewise possible to use another high molecular weight alkylamine or Dinoram S or a different alkylpropylenediamine-1,3. The resulting diester from Dinoram S has an AZ of 352.5; the theoretical value of the AZ of the alkylamino-1-propylamino-3-dipropionic acid diethyl ester deriving from Dinoram S, i.e. the compound which essentially results, is 354.

(1b) *Amidation of the diester described at 1a, paragraph 1, with ethylenediamine in mol ratio 1:2*

725 g. (1.5 mol) of the diester described at 1a, paragraph 1, and 230 g. (3.8 mol) of ethylenediamine are converted, while stirring at 110–130° during 36 hours, to the diamide while simultaneously distilling off the resulting ethyl alcohol, working being effected during the last 6 hours at 100–110° in a vacuum. The product is a dark yellow hard, wax-like mass. The yield amounts to 762 g.=99% of theory. The AZ is 575, that of β-stearylaminodipropionic acid di-1,1'-aminoethyl-2,2'-amide, i.e. the compound which essentially results, is 578.5.

Instead of the stearylaminodipropionic acid diethyl ester it is likewise possible to use the ester mixture described at 1a, paragraph 2, for the amidation with ethylene diamine. In this case a diamide having an AZ of 694 is obtained. The AZ of alkylamino-1-propylamino-3-dipropionic acid di-1,1'-aminoethyl-2,2'-amide deriving from Dinoram S, i.e. the compound which essentially results, is 673.

(1c) *Carbamidation of the diamide obtained at 1b, paragraph 1, with urea in mol ratio 1:2*

366.1 g. (0.7 mol) of the amide described at 1b, paragraph 1, are carbamidated with 84 g. (1.4 mol) of urea at 110–130° during 10 hours while simultaneously blowing out with nitrogen the liberated ammonia. The product is a yellow, hard mass, which is obtained in a yield of 420 g.=98.5% of theory and whose AZ is 133.3. The AZ of the compound of Formula 1c, $$C_{18}H_{37}N(CH_2CH_2CONHCH_2CH_2NHCONH_2)_2 \quad (1c)$$

i.e. the compound which essentially results, is 165.

(1d) *Quaternization of the carbamidated diamide obtained at 1c with dimethyl sulphate in mol ratio 1:1*

37.2 g. of dimethyl sulphate are added dropwise, during 30 minutes at 80–85° while stirring, to 200 g. of the compound described at 1c. In order to complete quaternization the reaction product is maintained for 2 hours at 80–85° while stirring further. The resulting product is a brown, tough mass, to which a slime-like consistency is imparted by diluting with water to 50%.

The product is soluble in water giving a small amount of turbidity.

EXAMPLE 2

(2a) *Addition of stearylamine to acrylic acid ethyl ester in mol raito 1:1*

210 g. (2.1 mol) of acrylic acid ethyl ester is run into 539 g. (2 mol) of molten stearylamine at 40–45° while stirring well and cooling slightly. After 2 hours, the temperature is slowly brought to 60° and, in order to complete the addition, the reaction mixture is kept at this temperature for 5 hours. The resulting product is a light yellow, soft paste, which is obtained with a yield of 740 g.=100% of theory. The AZ of this substance is 262. The AZ of β-stearylaminopropionic acid ethyl ester, i.e. the compound which essentially results, is 271.8.

(2b) *Amidation of the ester obtained according to 2a with 1-amino-3-dimethylaminopropane in mol ratio 1:1*

383 g. (1 mol) of the ester described at 2a and 122 g. (1.2 mol) of technical 1-amino-3-dimethylaminopropane are amidated at 110–140° during 22 hours while simultaneously distilling off the resulting ethyl alcohol. During the last half-hour working is effected in a vacuum. The resulting product is a light yellow, waxy paste, which is obtained with a yield of 435 g.=98.5% of theory. The AZ of this material is 471, that of stearylaminopropionic acid-3-dimethylaminopropyl-1-amide, i.e the compound which essentially results, is 471.

(2c) *Carbamidation of the amide obtained according to 2b with urea in mol ratio 1:1*

666 g. (1.5 mols) of the amide described at 2b are carbamidated with 91 g. (1.5 mols) of urea at 110–130° during 6 hours while simultaneously blowing out with nitrogen the liberated ammonia. The resulting product is obtained with a yield of 731 g.=98.5% of theory; it is a dark brown mass of which the AZ is 212.5, while that of the compound of Formula 2c,

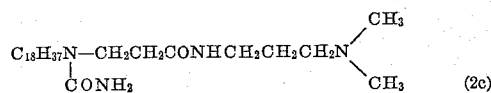

i.e. the compound which essentially results, is 206.

When carbamidation in this example is effected, instead of with urea, with the equivalent amount of carbaminic acid methyl ester, a very similar product is obtained.

(2d) *Quaternization of the carbamide obtained according to 2c with dimethyl sulphate in mol ratio 1:1*

At 55–70° during 1½ hours while stirring there is added dropwise 103.5 g. of dimethyl sulphate to 350 g. of the compound described at 2c. In order to complete the reaction, the reaction mixture is maintained for 2 hours more while stirring at 70°. The resulting product is a tough, dark brown mass which is soluble in water giving a slight turbidity.

EXAMPLE 3

(3a) *The ester obtained at 2a is produced as there described*

(3b) *Amidation of the ester obtained according to 2a with ethylenediamine in mol ratio 1:1*

382 g. (1 mol) of the ester described at 2a and 90 g. (1.5 mols) of ethylenediamine are converted to the amide at 110–120° during 28 hours while simultaneously distilling off the resulting ethyl alcohol. During the last half-hour working is effected in a vacuum. The product is a light yellow, soft paste, which is obtained with a yield of 389 g.=98.2% of theory. The AZ of this material is 506, the acetyl number is 271.9. The AZ of stearylaminopropionic acid-1-aminoethyl-2-amide (i.e. the compound which essentially results) is 524, the acetyl number of this is 300.1.

(3c) *Carbamidation of the amide obtained according to 3b with urea in mol ratio 1:1*

785.6 g. (2 mols) of the amide described at 3b are carbamidated with 120 g. (2 mols) of urea at 110–120° during 8 hours while simultaneously blowing out with nitrogen the liberated ammonia. The resulting product, after cooling, is present in the form of a yellow, brittle mass, which is obtained with a yield of 760 g.=98.5% of theory. The AZ of this material is 206.5, the AZ of the compound of Formula 3c, $$C_{18}H_{37}NH—CH_2CH_2CONHCH_2CH_2NHCONH_2 \quad (3c)$$

i.e. the compound which essentially results, is 235.

(3d) *Hydrochloride formation of the basic diamide obtained according to 3c with ammonium chloride in mol ratio 1:1*

During 30 minutes while stirring 26.75 g. (0.5 mol) of ammonium chloride are added portionwise to 243.5 g. (0.5 mol) of the carbamidated, basic diamide described at 3c. The hydrochloride is formed during 2 hours while splitting off ammonia. The resulting product, which is obtained with a yield of 265 g., is present in the form of a light yellow, brittle mass. The acid number of this material is 108, that of the hydrochloride of the compound of Formula 3c, i.e. the compound which essentially results, is 107.

*(3e) Carbamidation of the amide obtained according to 3b with urea in mol ratio 2:1*

606 g. (1.5 mols) of the amide described at 3b are carbamidated, at 110–140° during 13 hours with simultaneous blowing out with nitrogen of the liberated ammonia, by means of 48 g. (0.75 mol) of urea. The resulting product is a yellow, brittle mass. The yield is 616 g.=98% of theory. The AZ of this material is 221, that of the compound of Formula 3e,

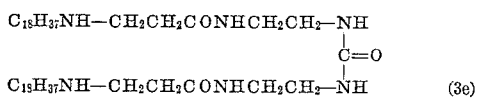

i.e. the compound which essentially results, is 241.

When the carbamidation in this example is effected, instead of with urea, with an equivalent amount of diethyl carbonate, there is obtained a very similar product with the splitting off of ethyl alcohol.

EXAMPLE 4

*(4a) Addition of Dinoram S to acrylic acid ethyl ester in mol ratio 1:1*

400 g. (4 mol) of acrylic acid ethyl ester is run, at 40–45° while cooling slightly and stirring well, into 1460 g. (4 mol) of molten Dinoram S. After one hour the reaction temperature is brought slowly to 50–55° and, in order to complete the addition, the reaction material is kept at this temperature for 5 hours. The resulting product is a yellow, pasty mass which is obtained in a yield of 1860 g.=100% of theory. The amine number of the material is 431.5, that of the resulting alkylamino-1-propylamino-3-propionic acid ethyl ester derived from Dinoram S (i.e. the compound which essentially results) is 432.

*(4b) Amidation of the ester obtained according to 4a with 1-dimethylaminopropylamine-3 in mol ratio 1:1*

698 g. (1.5 mol) of the ester described at 4a are converted, at 100–130° while simultaneously distilling off the resulting ethyl alcohol, with 180 g. (1.75 mol) of 1-dimethylaminopropylamine-3, the conversion taking 28 hours. During the last 2 hours working is effected at 100° in a vacuum in order to distill off the remaining alcohol and the excess of amine. The resulting product is a dark brown, honey-like mass which is obtained in a yield of 775 g.=98.5% of theory. The AZ of this material is 584, that of alkylamino-1-propylamino-3-propionic acid-1-dimethylaminopropyl-3-amide derived from Dinoram S (i.e. the compound which essentially results) is 578. Instead of using 1-dimethylaminopropylamine-3 it is likewise possible to use ethylenediamine for the amidation. In this case the AZ of the resulting amide is 651, that of alkylamino-1-propylamino - 3 - aminopropionic acid - 1-aminoethyl-2-amide derived from Dinoram S (i.e. the compound which essentially results) is 664.

*(4c) Carbamidation of the amide obtained according to 4b, paragraph 1, with urea in mol ratio 1:1*

725 g. (1.4 mol) of the amide described at 4b, paragraph 1, are carbamidated, at 110–150° during 24 hours while simultaneously blowing out with nitrogen the freed ammonia, with 88 g. (1.5 mol) of urea. On the basis of the amine number and the amount of ammonia split off, it is seen that the reaction has led to dimerization. This product is a dark brown, pasty mass which is obtained with a yield of 753 g.=97.5% of theory. The AZ of this product is 271.5, that of the compound of formula 4c,

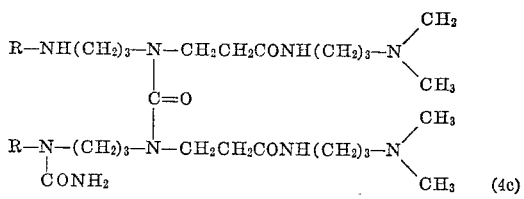

i.e. the compound which essentially results, is 273.

*(4d) Quaternization of the compound obtained according to 4c with dimethyl sulphate in mol ratio 1:3*

265 g. of dimethyl sulphate are added dropwise, at 55–75° during 3 hours, to 700 g. of the compound described at 4c. In order to complete the reaction, the reaction material is kept for a further 2 hours at 75–78° while stirring. The resulting reaction product is a tough, dark brown mass which is slightly soluble in water.

In the above examples it is possible to use likewise monochloracetic acid, chloroacetamide, benzylchloride, monochlorohydrin or alkoxides, with the simultaneous use of equimolecular amounts of water, as quaternization agent instead of dimethyl sulphate. Furthermore, when acrylic acid ethyl ester is replaced with the equivalent amount of acrylic acid methyl ester, practically equivalent compounds result.

In all the above examples the amidations mentioned have to be effected in an atmosphere of nitrogen or other inert gas.

EXAMPLE 5

*(5a) The ester obtained at 4a is produced as there described*

*(5b) Amidation of the ester obtained according to 4a with stearylamine in mol ratio 1:1*

464 g. (1 mol) of the ester described at 4a and 269.5 g. (1 mol) of stearylamine are converted, at 100–140° while simultaneously distilling off the resulting ethyl alcohol during 20 hours, to the amide. During the last hour working is effected at 100° in a vacuum in order to distill off the remaining alcohol. The resulting product is a light brown, waxy mass which is obtained with a yield of 663 g.=97% of theory. The AZ of this product is 301, that of alkylamino-1-propylamino - 3 - propionic acid stearylamide derived from Dinoram S (i.e. the compound which essentially results) is 294.

Instead of the stearylamine it is likewise possible to use higher alkylamines, either singly or in admixture, in order to effect amidation. Higher alkylamines indicate aliphatic amines containing from 12 carbon atoms to 30 carbon atoms inclusive. Commercially they are mostly obtainable as mixture of amines of various molecular weight and having from 12 to 22 carbon atoms inclusive.

*(5c) Carbamidation of the amide obtained at 5b, paragraph 1, with urea in mol ratio 1:1*

667 g. (1 mol) of the amide described at 5b, paragraph 1, and 60 g. (1 mol) of urea are carbamidated at 100–130° during the course of 8 hours while simultaneously blowing out with nitrogen the liberated ammonia. The product is obtained with a yield of 680 g.=96% of theory; it is a brown, tough, waxy mass having an AZ of 135, that of the compound of formula 5c,

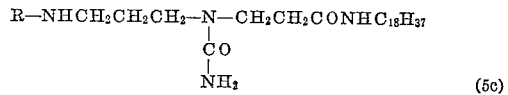

i.e. the compound which essentially results, is 142.

*(5d) Quaternization of the carbamide obtained according to 5c with dimethyl sulphate in mol ratio 1:1*

75 g. of dimethyl sulphate are added dropwise, at 55–62° during 1½ hours while stirring, to 400 g. of the compound described at 5c. In order to complete the reaction, the reaction material is kept for a further 2 hours at 60° while stirring. The resulting product is a tough, red-brown mass which is soluble in water giving slight turbidity.

EXAMPLE 6

30 g. of the product described at 2d and 0.3 g. of a 5% aqueous sodium bisulphite solution in 780 g. of completely demineralized water are dissolved in a polymerization vessel equipped with an anchor stirrer. After the air in the reaction vessel has been replaced with nitrogen, the resulting solution is warmed to 40°. From a dropping funnel 200 g. of methylmethacrylate are added thereto during 2–3 hours, whereupon the polymerization is started by the addition of 2 g. of a 1% aqueous ferrous sulphate solution and 1 g. of a 30% hydrogen peroxide solution. The temperature is maintained between 40–45°. After the addition of methylmethacrylate is complete, polymerization is brought to an end at 50–55°. The polymerizate is obtained with a yield of about 96–98% of theory. The emulsion containing about 22% of polymerizate has a pH value of about 3.0–3.5 and a viscosity of about 20–30 centipoises (Brockfield, U=100/min.). The resulting emulsion may be used as after-treatment agent in the dyeing of nylon stockings in the following manner:

1–5% of emulsion, based on the weight of the goods, are diluted with demineralized water to a liquor ratio of 1:30 in a bath. The stockings are treated in this liquor for 20 minutes at 45°. Subsequently they are slightly rinsed, spun and formed and finished in the usual manner. The stockings treated in this way have an improved resistance to the formation of ladders. Furthermore, the stockings acquire a firmer feel.

EXAMPLE 7

Knitted nylon material is dyed, with a liquor ratio of 1:50, in a bath containing, based on the weight of the goods, 1% of Lanasyn-bordeaux RL (Colour Index: Acid Red No. 217), 2% of acetic acid (80%) and 0.68% of a mixture consisting of 10 parts by weight of the product described in Example 5d and 24 parts by weight of oleyl-eikosipentaglycol ether in the following manner: The dye goods are placed into the bath at 50°, the temperature of the bath is brought to the boil during 45 minutes while moving the dye goods and dyeing is continued at the boil for a further 60 minutes. After boiling for 15 minutes a further 2% of acetic acid is added. After finishing the dyeing, warm and cold rinsing are effected and the goods are subsequently dried.

The dyed nylon knitted material has a stripe-free and level appearance, as opposed to a blank test in which dyeing was effected without the addition of the product described in Example 5d.

EXAMPLE 8

Banlon knitted material is moved for 5 minutes at 50° in a bath containing, based on the weight of the goods, 2% of acetic acid (80%) and 0.85% of the mixture stated in Example 7. Thereupon 0.5% (of the weight of the goods) of Lanasyndunkelviolett RL (Colour Index: Acid Red No. 66) is added and dyeing is effected as described in Example 7. After boiling for 15 minutes 1.5% (of the weight of the goods) of acetic acid are added.

The dyed sample shows only little stripiness and has a level aspect, while a corresponding sample dyed without the addition of the product described in Example 5d, was irregular and strongly striped.

In the Examples 1 to 5 the stearylamine may be replaced by other fatty amines and the Dinoram S by alkylaminopropylamines the alkyl radical of which derives from fatty acids other than those contained in the arachis oil.

In these examples the acrylic acid ethyl ester may be replaced without prejudice by other low molecular esters of this acid, for example the methyl, propyl and butyl ester, and the ethylene diamine or the diethylenetriamine respectively may be replaced by the corresponding propylenediamine and dipropylenetriamine and the 1-dimethylaminopropylamine-3 by 1-dimethylaminoethylamine-2.

We claim:

1. A member selected from the group consisting of compounds of the formula

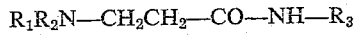

their acid addition salts and quaternary ammonium compounds, in which $R_1$ is selected from the class consisting of alkyl ($C_8$–$C_{22}$) and

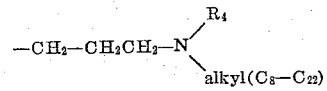

$R_2$ is selected from the class consisting of hydrogen, —$CONH_2$.

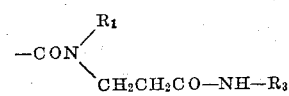

and

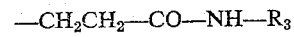

$R_3$ is selected from the class consisting of alkyl ($C_2$—$C_{22}$) and

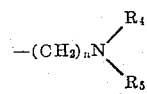

where $n$ is an integer selected from 2 and 3, $R_4$ is selected from the class consisting of hydrogen, alkyl ($C_1$–$C_{22}$), —$CONH_2$ and

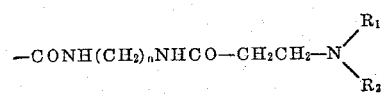

$R_5$ is selected from the class consisting of hydrogen and alkyl, with the proviso that the entire molecule must contain at least one grouping —NCON—.

2. The compound of the formula $$C_{18}H_{37}N(CH_2CH_2CONHCH_2CH_2NHCONH_2)_2$$

3. The compound of the formula

4. The compound of the formula $$C_{18}H_{37}NH—CH_2CH_2CONHCH_2CH_2NHCONH_2$$

5. The compound of the formula

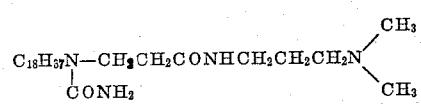

6. A compound of the formula

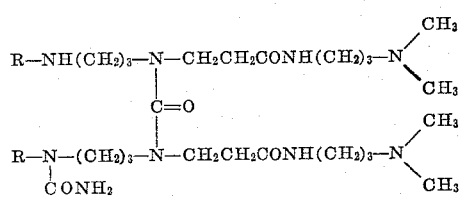

where R signifies a radical selected from $C_{20}H_{41}$ and $C_{22}H_{45}$.

7. A compound of the formula $$\text{R—NHCH}_2\text{CH}_2\text{CH}_2\text{—N—CH}_2\text{CH}_2\text{CONHC}_{18}\text{H}_{37}$$
$$|$$
$$\text{CO}$$
$$|$$
$$\text{NH}_2$$

where R signifies a radical selected from $C_{20}H_{41}$ and $C_{22}H_{45}$.

References Cited

UNITED STATES PATENTS 2,254,136   8/1941   Buck et al. _____ 260—553
3,006,955   10/1961  Steinbrunn et al. ____ 260—553

HENRY R. JILES, *Primary Examiner.*